US007079487B2

(12) United States Patent
Derou-Madeline et al.

(10) Patent No.: US 7,079,487 B2
(45) Date of Patent: Jul. 18, 2006

(54) ADAPTIVE ROUTING PROCESS BY DEFLECTION WITH TRAINING BY REINFORCEMENT

(76) Inventors: Dominique Derou-Madeline, 204, rue des Chênes, 50400 Yquelon (FR); Laurent Herault, 11 avenue Bougault, F38640 Claix (FR)

( * ) Notice: Subject to any disclaimer, the term of this patent is extended or adjusted under 35 U.S.C. 154(b) by 896 days.

(21) Appl. No.: 10/020,414

(22) Filed: Dec. 18, 2001

(65) Prior Publication Data

US 2003/0145111 A1    Jul. 31, 2003

(30) Foreign Application Priority Data

Dec. 22, 2000  (FR) .................................. 00 16929

(51) Int. Cl.
*H04J 1/16*  (2006.01)
*H04J 3/14*  (2006.01)

(52) U.S. Cl. ...................... 370/235; 370/255; 370/400; 370/412

(58) Field of Classification Search ................ 370/349, 370/400, 397, 237, 465, 238, 471, 230, 473, 370/412, 474, 389, 235, 236, 236.1, 236.2, 370/255; 714/4, 47, 57
See application file for complete search history.

(56) References Cited

U.S. PATENT DOCUMENTS 5,717,689 A *  2/1998  Ayanoglu .................... 370/349
6,122,759 A *  9/2000  Ayanoglu et al. ............. 714/57

OTHER PUBLICATIONS

Fakhraei, "Evaluation of an ATM LAN constructed with a cyclic deflection-routing network", 8 pages.
Choudhury, et al., "Effect of Contention Resolution Rules on the Performance of Deflection Routing", 1991, 7 pages.
Choi, et al., "Predictive Q-Routing: A Memory-based Reinforcement Learning Approach to Adaptive Traffic Control", 7 pages.
Boyan, et al., "Packet Routing in Dynamically Changing NetworksL A Reinforcement Learning Approach", 8 pages.
Watkins, et al., "Technical Note Q-Learning", 1992, 14 pages.
Jaakkola, et al., "Convergence of Stochastic Iterative Dynamic Programming Algorithms", 5 pages.

* cited by examiner

*Primary Examiner*—Dang Ton
*Assistant Examiner*—Inder Pal Mehra
(74) *Attorney, Agent, or Firm*—Berkeley Law & Technology Group, LLC

(57) ABSTRACT

The invention concerns a management process for a network of routers based on the technique of training by reinforcement in which priority is given to objects already present in the network over those which wish to enter.

8 Claims, 3 Drawing Sheets

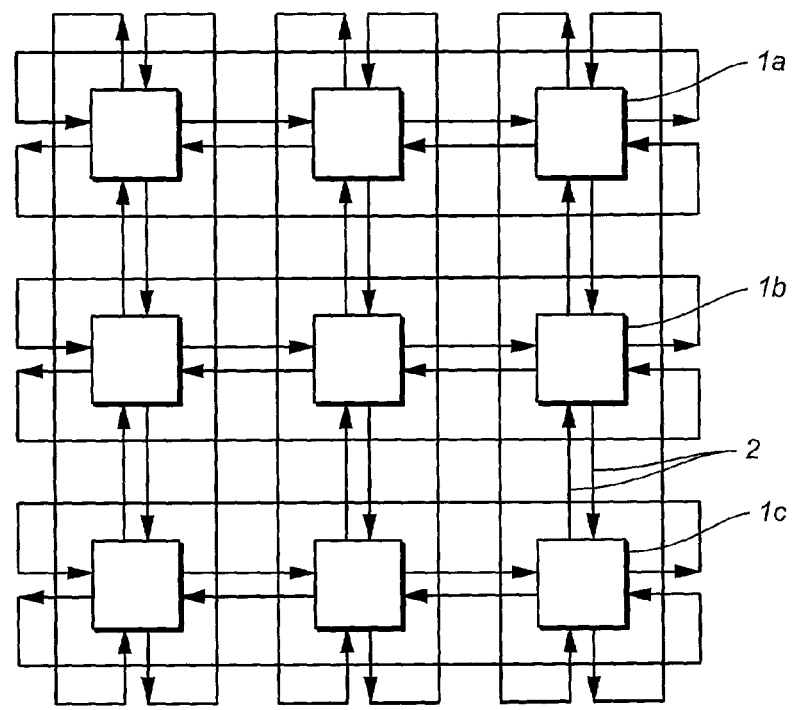
FIG._1
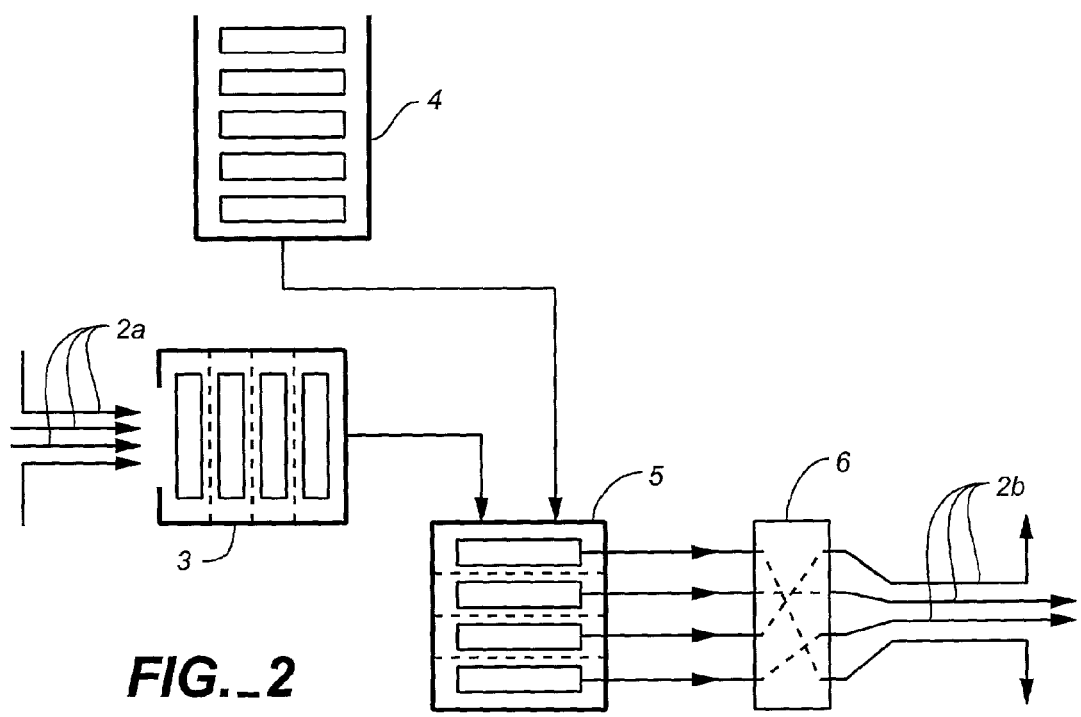
FIG._2

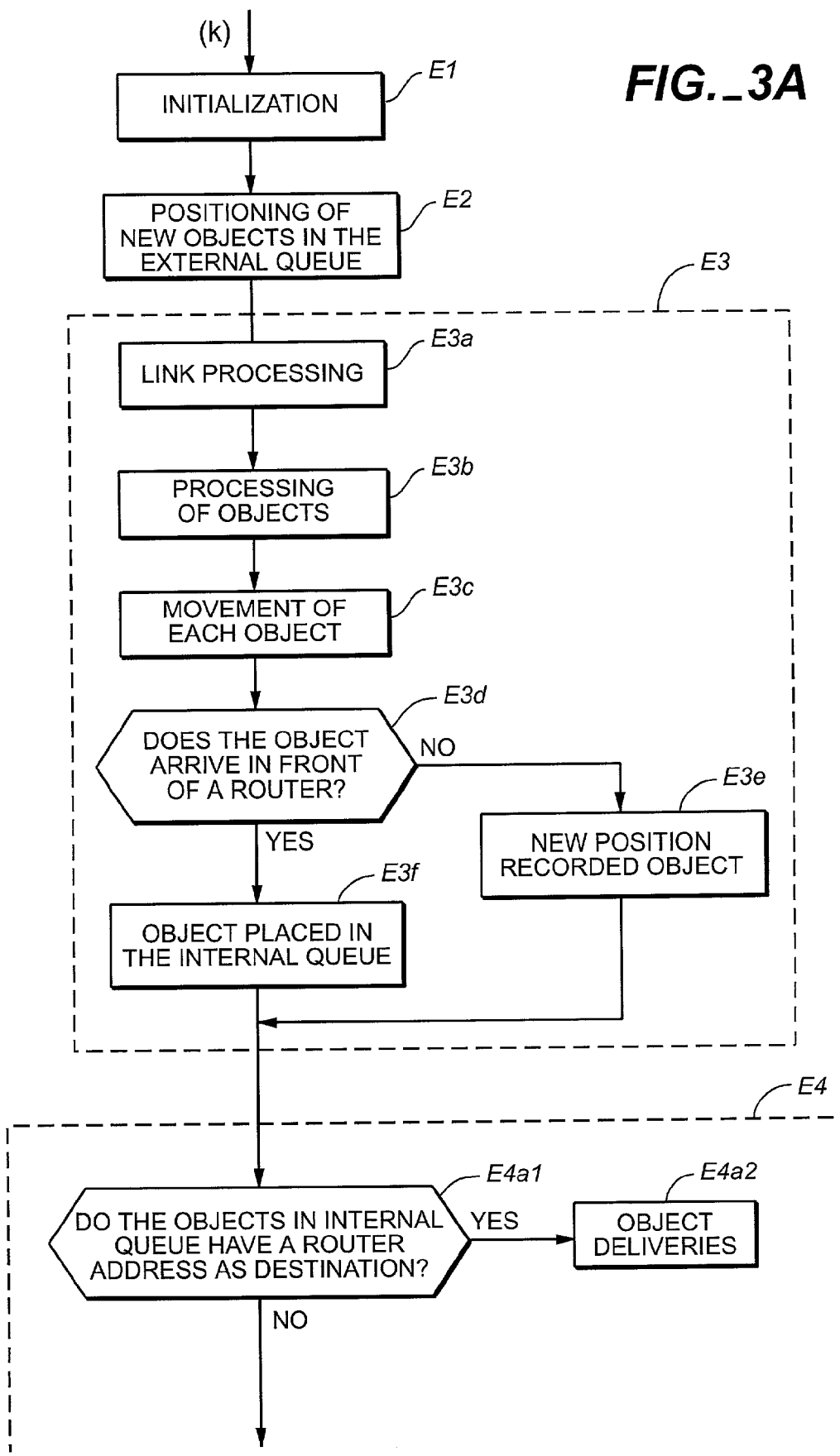
FIG._3A

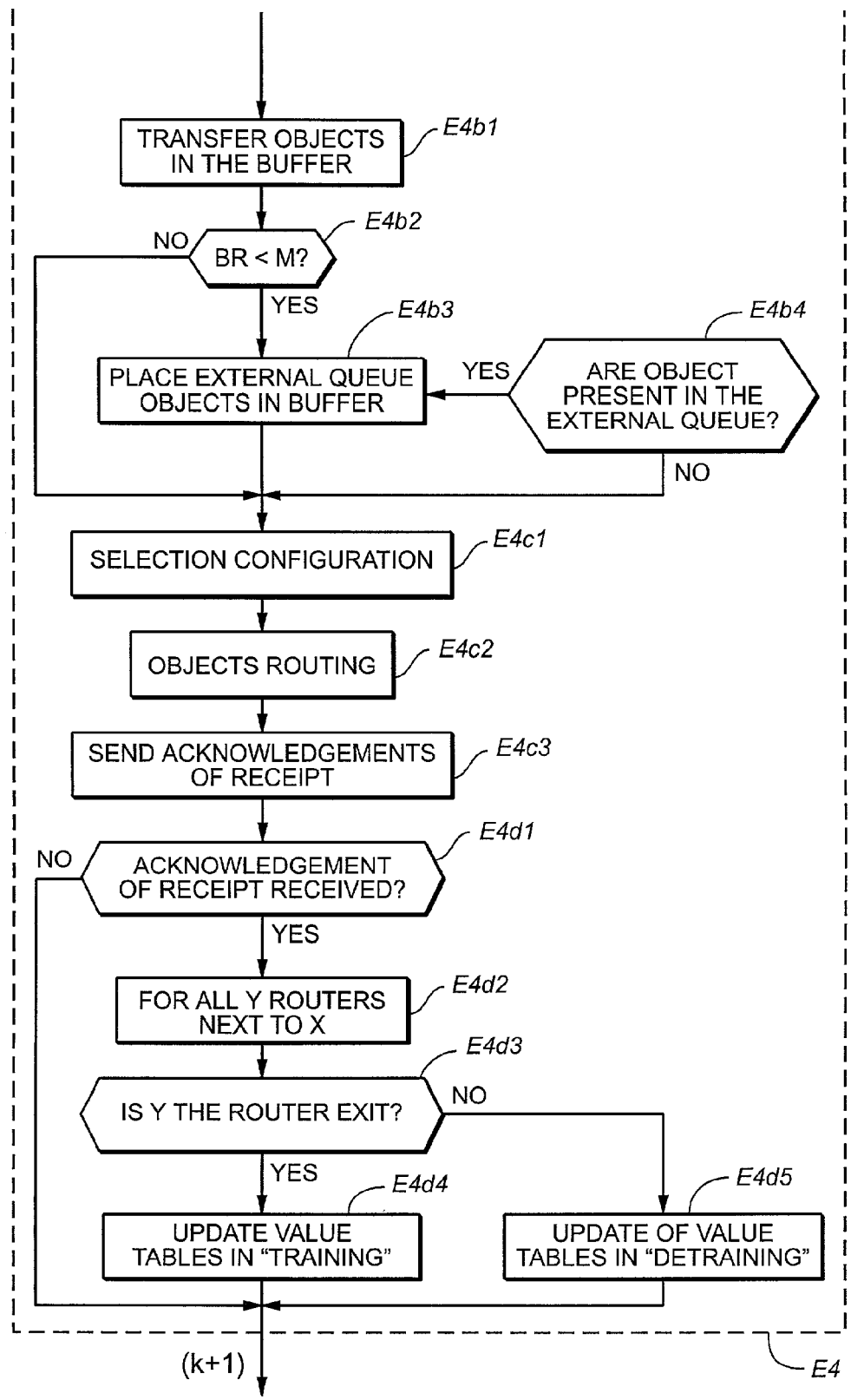
FIG._3B

ADAPTIVE ROUTING PROCESS BY DEFLECTION WITH TRAINING BY REINFORCEMENT

FIELD OF INVENTION

The invention concerns an adaptive routing process by deflection of objects circulating in a network of routers in which the objects already present in the network have priority over the objects which request to enter.

The invention applies to networks of routers in which objects that are intended to be transported to a destination circulate, fixed in advance via an optimum path. In particular the invention can be applied to telecommunications networks for transferring information packets. It can also apply to logistic networks for routing parcels or letters on sorting chains in transport companies.

The invention can also apply to router networks to help in moving vehicles while avoiding congested areas as much as possible so as to send vehicles from one point to another as quickly as possible while avoiding collisions with other vehicles.

STATE OF THE TECHNOLOGY

There are currently several types of management processes for a network of routers also called "routing processes".

One of these processes is the Q-LEARNING process which is described notably in the article of T. JAAKKOLA, M. JORDAN and S. SINGH entitled "Convergence of stochastic iterative dynamic programming algorithms" in *Advances in Neural Information Processing Systems*, vol. 6 pages 703–710, 1993 and in the article of C. WATKINS and P. DAYAN entitled "Technical note on Q-Learning", in *Machine Learning*, 8 (3), pages 279–292, 1992.

A method of Q-LEARNING using a training method by reinforcement is described in the article of J. BOYAN and M. LITTMAN "Packet routing in dynamically changing networks: a reinforcement learning approach" in *Advances in Neural Information Processing Systems*, vol. 6 pages 671–678, 1993. This article explains a problem whose solution is attempted: when an object P arrives on a router x with a router d as final destination then router x must decide from the local information which is specific to it to which of its neighbouring routers y it should switch the object P so that the latter arrives as soon as possible at its final destination. In this document, J. BOYAN and M. LITTMAN suggest resolving the problem by estimating the time necessary for the object P to go from router x to router d while using a reinforcement training method.

In this method all the objects arrive either from the external queue or in the network's internal links in a buffer line that makes it possible to back off the objects before routing them via the router. It is therefore necessary in the Q value updating equation to take into account the length of the external queue of the current router x. Thus the values Qx (d, y) supply an indication of the estimation of the time necessary for the object to reach its destination d from x being routed on y. The Q values take account of the journey time remaining to be crossed and the congestion of the neighbouring router. This time being indicative of the time necessary to the objects present in y's external queue to enter the network and therefore indicative of the waiting time engendered for the object in x which does not have priority over the external queue objects of neighbour y.

With such a method it is not possible to systematically give priority to objects present in the network since any object entered into the network has priority. Indeed, in this method, and where priority is given to objects present in the network, congestion of the external queues of routers has no influence on the journey time of an object circulating within the network and does not allow the delay caused by the load of neighbours of the routers to be estimated.

This method can, therefore, not resolve the routing problems of objects in a network in which priority is given to objects already present in the network.

This Q-LEARNING process linked to a reinforcement training method is called a "Q-ROUTING method". This method has the advantage of being very effective and making it possible to obtain a solution close to that supplied by the traditional "shortest path" algorithm when there's a weak traffic load on the network. When the traffic load increases this method remains very effective although it requires a short adaptation period. This Q-ROUTING method also adapts its routing strategy to occasional modifications of the network topology.

These advantages are obtained by the fact that routing decisions are made locally and the values that alone permit routing decisions are gathered in a single table containing time network traffic load information and router physical address information simultaneously.

Nevertheless, this process has the following disadvantage: the system must learn an optimum path with a stationary load. As soon as the load changes new training is necessary and this is very slow. Moreover, when the traffic load diminishes, the Q-ROUTING process does not have the capacity to quickly reconverge towards the initial effectiveness (ie the shortest route) because only data involving the router visited is updated. There is therefore an hysteresis effect in the training of routing tables.

This adaptation inertia to traffic variations is highly inconvenient in practice because it prevents any absorption of sporadicity which is essential for most applications.

To avoid this hysteresis effect a process has been described in the article of S. CHOI and D. YEUNG entitled "Predictive Q-routing: a memory-based reinforcement learning approach to adaptive traffic control", submitted to Neural Information Processing Systems. This document suggests the use of wave traffic. To achieve this "probe" objects are sent to routers whose Q values are very high and have not been modified for a long time so as to update the corresponding Q values. To do this the document suggests predicting by a linear extrapolation what corrections should be applied to the Q values before evaluating them to find the best allocation of objects on the exits. Nevertheless, this method requires the use of four tables at the level of each router that significantly increases the processing times.

Another method to avoid the hysteresis effect could consist in using thermodynamic noise in the □ allocation choice mechanism so as to guarantee a proper exploration of the space of the states. This method is appropriate when the load ratio is homogenous. Nevertheless as the training should be continual in the network's unsteady environment, it seems difficult to control a pseudo temperature descent law.

REPORT OF THE INVENTION

The invention has as its goal to correct the drawbacks of the routing processes described above.

To this end, it proposes a router network management process based on the reinforcement training technique in which priority is given to objects already present in the network over those that seek to enter.

More specifically, the invention concerns an adaptive routing process for objects in a digital network that contains a plurality of routers linked among themselves by links. Each router includes:

M incoming link and M outgoing links
An internal queue
An external queue
An M size router buffer and
A processing module Each router is linked to a routing table including values relating to the estimation of the number of deflections undergone by each object at the beginning of this router for a given destination. The said process includes a first initialisation stage of the table of values linked to each router then a recurrent processing stage for each network link consisting of:

a) detecting if at least one object has arrived on at least one router
b) considering each link of the network and seeing if there is at least one object on these links
   if yes move the objects along links with a time unit
   if not wait for a time unit
c) consider each network router and for each one detect the state of its incoming links
   if the presence of an object is detected on an incoming link and the destination of this object is the router considered then since the said object has arrived at its destination it is removed from the network
   if no object with this router's destination is detected on the incoming links check the state of the internal queue:
   if the queue contains objects transfer these objects in the router buffer
   if the said router is not full check if objects are on standby in the external queue and fill the buffer with part at least of the objects on standby In this external queue, characterised by the fact that it consists of:
d) allocating the content of the routing buffer on the outgoing links of the router according to linked routing table and dynamically estimate the number of deflections which the objects will undergo on forward points of the router to reach their destination;
e) update the values of the linked routing table to estimate the number of deflections undergone on the whole journey by the objects the advantage is that on the arrival of an object each router sends to the preceding router an acknowledgement of receipt indicating the number of estimated deflections undergone by the object to go up to the destination router.

According to an implementation mode of the invention stages c) to e) are carried out for each router simultaneously Stage c) of the invention process can consist of taking into account the information contained in the acknowledgements of receipt sent by all the neighbouring routers to update routing tables.

BRIEF DESCRIPTION OF THE FIGURES

FIG. 1 represents in a diagram an example of a network router linked by bi-directional links FIG. 2 represents the functional diagram of a network router of FIG. 1

FIGS. 3A, 3B etc represent the general flowchart of the invention process.

DETAILED DESCRIPTION OF THE INVENTION'S IMPLEMENTATION MODES

On FIG. 1 an example of a router network including several routers linked to each other with bi-directional links has been represented in a diagram. In this example the network is made up of 3×3 routers.

On this figure the different network routers have been marked $1a$, $1b$, $1c$ etc and the incoming and outgoing links which link the routers two by two have been represented by arrows. Reference 2 represents these bi-directional links between the routers.

These links ensure the circulation of objects between the routers. These objects are each characterised by their destination. Each object passes into the network by one or more routers until it reaches its destination. To do this the objects enter into the network by an incoming router, pass into the router network as a router along the links and exit from the network by the router corresponding to their destination.

Each router has incoming and outgoing links. The role of the routers is to "route" the objects in transit ie to calculate an allocation for the objects that are at their entrance and to remove them by one of their exits. To do this each router has its own decision resources. It can thus be responsible for directing the objects which come to it according to the destinations requested for these objects by optimising the service quality and managing any conflicts as well as possible.

In FIG. 2 the functioning of a router network router has been represented in a diagram, represented in FIG. 1.

As can be seen in this figure each router consists of incoming links marked $2a$ and outgoing links marked $2b$. The incoming links ($2a$) are the links that come from a neighbouring router. The objects transmitted by these incoming links ($2a$) are placed in an internal queue marked 3 ie a queue that contains only objects from other network routers. In parallel to this internal queue 3, the router consists of an external queue 4 in which objects requesting to enter in the network are placed.

These two queues 3 and 4, limited in size, are connected to a routing buffer 5 in which are inserted the next objects to be directed into the network towards other routers. As will be seen in more detail later this routing buffer M, limited in size, is filled as a priority by the objects contained in internal queue 3 and when there is space by objects present in external queue 4.

Decision resources 6 specific to each router provide the allocation decision of each object contained in routing buffer 5. They allocate the objects present in the routing buffer on the router's outgoing links. In other words decision resources 6 calculate if the object present in the routing buffer has arrived at its destination or if it should be directed to another network router so as to arrive to its destination.

Outgoing links $2b$ are connected to these decision resources 6. These outgoing links $2b$ thus contain the objects whose destination was not the router considered but another network router, the router considered having directed these objects to other neighbouring routers.

The routing network which have just been described thus have the aim of transporting the traffic of objects from their source to their destination while guaranteeing quality of service. According to their application this quality of service can be simply rapid service or a specific choice of transportation for example to avoid collisions in the application of the router traffic.

In the network just described routing is "distributed" ie the routing decision is not centralised but rather distributed in each network router. In this way each network router is equipped with autonomous decision resources (marked 61) that allow it at a given time to consider all the objects that it has to transmit and adapt its routing decision for each object according to its environment.

This routing network acts by deflections, a deflection being the gap between the path followed in reality by the object and the theoretical path initially planned, without taking account of the traffic. In other words this routing mode consists of distributing very quickly on the outgoing links the objects arriving at a given time on the router's incoming links. Thus when two objects arrive on the same router and these objects wish to take the same exit, one of the objects takes this exit and the other object is deflected ie it is sent on another link which was not its preference. This concept makes it possible to supply a rapid regulating mode for conflicts within the router.

Each network router is linked to a value table that contain the estimations of the number of deflections necessary to go from the router considered to any other network router by the M exits of the router considered. More specifically, where the quality criterion is the transit period the value table contains all the estimation information of the time required to go from the router considered to another network router by one of the M router exits.

The router value tables are updated thanks to acknowledgement of receipts each sent by the router considered to the preceding router via the link which links these two routers. These acknowledgements of receipt indicate the number estimated by deflections undergone by the object to go from the router considered to the destination router.

In other words the value table of router x contains the estimations of the number of deflections necessary to go from this router to all the other network routers by the M exits of router x. in the event that the quality criterion is the duration of the journey this table contains all the estimation information of the time required to go from x to any other network router by one of the m exits of x.

In FIG. 3 the flowchart showing the different stages of the invention process has been represented in a diagram.

The first stage, marked E1, is an initialisation stage. In this stage all the variables used in the invention process are initialised. Thus:

$\psi$ is an allocation configuration, if N objects are meant to be routed the allocation configuration $\psi$ is made up of N allocations yi ($\psi$)

Sx (d, y) is the distance between x and d exiting by router y

Sx (Di, yi ($\psi$) is the distance between x and di exiting by router Yi ($\psi$)

Ptransit={Pi, (Si, di)} is the set of objects in transit: each object Pi comes from the neighbouring router Si and the destination di $\eta \in [0, 1]$ is the training ratio $\gamma \in [0, 1]$ is the omit ratio Qz (di, y) is an evaluation of the number of deflections undergone by the objects going from x to di exiting from x by y. the number of deflections is calculated compared to the exit to the shortest topological path.

In particular table $Q_x$ of router x is initialised as follows:

$$Q_x^{t=0}(d,y)=0 \; si \; S_x(d,y)=\min_{y, voi\,sin\,de\,x}(S_x(d,y^1))$$

next to $$Q_x^{t=0}(d,y)=1$$

otherwise

The invention process continues by a succession of iterations (stages E2 to E4). Each iteration corresponds to the arrival of new objects in the external queues and to the activation of all the network routers so as to admit possible objects coming from the outside and to route objects coming from neighbouring routers.

The flowchart in FIG. 3 represent the invention process for iteration k. When all the stages of the flowchart have been carried out for this iteration k the process is repeated for iteration k+1.

The number T of iterations is only limited by the CPU time that may be desired to allow to the process. T is nevertheless enough to take into account the network behaviour.

Each iteration in the invention process has two stages:

the E2 stage which corresponds to the arrival of new objects on certain routers or on all the router networks and the E3 stage that corresponds to the route of all the network links and to the movement of objects along these links.

More specifically in the E2 stage new objects arrive on certain network routers so as to pass through the network. These new objects are characterised by their destination ie by the destination router address. Each new object is placed in an external queue of the router in front of which it appears.

Stage E3 consists of processing the objects present in the network links. More specifically this stage E3 consists first of all in sequentially processing all the network links (substage E3a). It then consists in substage E3b of sequentially processing all the objects contained in each link. Any object present on the link considered is then advanced by a box along the link (sub-stage E3c), each "box" corresponding to the movement of an object on a link for a time unit.

Stage E3 then consists of checking in substage E3d if the movement implies that the object arrives on a router. If this is the case then the object is placed in an internal router queue (stage E3f). If it is not the case then the object's new position on the link is recorded (stage E3e) and will be taken into account during stage E3 at the next iteration.

The invention process continues by stage E4 that consists of crossing in a random sequential order all the network routers and carrying out on each of these routers a certain number of operations. These operations can be carried out on all the routers simultaneously or on each router successively.

Stage E4 is divided into sub-stages E4a to E4d. Stage E4a consists, before carrying out the admission of new objects in the internal queue, of studying the list of objects present in this internal queue and in particular their destinations. The objects present in this internal queue that have arrived at the destination (in this case their destination is the router considered) are delivered and withdrawn from the network.

More specifically, this stage E4a consists of an E4a1 test that checks if the objects contained in the internal queue have as destination the router address considered. If this is the case then the objects are delivered during stage E4a2. If this is not the case then we can go on to stage E4b which fills the routing buffer.

This E4b stage contains first of all an E4b1 stage, which consists of transferring the objects contained in the internal queue and not delivered (ie which have not arrived at destination) in the routing buffer. Of course, the oldest objects contained in the queue are transferred first in the routing buffer. If there is not enough space in the routing buffer only a part of the objects contained in this internal queue is transferred in the routing buffer.

An E4b2 consists then of checking if the number of BR objects in the routing buffer is significantly less than M ie among the available places in the buffer. If this is the case, then the invention process consists in looking into the external queue (E4b4 test) if there are objects present. If this is the case, then the objects present in the external queue are inserted in the routing buffer so as to fill the routing buffer. In other words for an M size routing buffer if there are BR objects already placed in the buffer (objects coming from the internal queue) then it is possible to insert in the buffer M-BR objects coming from the external queue. On the other hand, if it turns out at the E4b2 stage that the routing buffer is already fully filled by the objects, which come from the internal queue then no object coming from the external queue is not inserted in the routing buffer.

Indeed, in this routing mode, the router can route a maximum M objects simultaneously or an object by exit.

This process thus gives priority to objects in transit ie to objects already present in the network routers. The new objects can only enter into the network if there is available place. This process guarantees that an object cannot be "killed" in the network ie withdrawn from the network as long as its routing is not finished.

The invention process is carried out by the E4c routing stage of objects, properly speaking. This routing stage is the calculation for all the objects present in the routing buffer, the destination router and the exit on which the object is allocated.

In the invention process each router has an overall strategy allowing it to roughly estimate the trajectory of objects, which it should route so they reach their destination by avoiding the network's dense regions, which a priori minimises the collision risks and by also avoiding venturing into blocked regions. In this process the router also has a local strategy allowing it to calculate an admissible allocation ie not to give the same exit to two different objects.

Thus at the level of a router the strategy consists of aiming at the optimum path for each object to be routed if it is available or a sub-optimum path by giving priority to avoiding collisions by means of deflections.

The routing principle by deflection consists of distributing objects from the internal queue on the M router exits according to the destinations desired by the objects. On other words, the process consists of finding an allocation configuration of objects present in the internal queue, which is optimum in terms of the criteria chosen.

The invention process proposes to use internal network traffic indicators. The chosen internal indicator is the dynamic estimation of the number of deflections that the objects should undergo at forward points of the router considered to reach their destination. In this way the object will be routed so as to minimise the total number of deflections that they have to undergo.

Once the allocation has been calculated the objects are transferred instantly to the router exits.

The E4c stage of the invention process consists first of all in selecting the best dynamic allocation configuration (E4c1 stage) for example that which minimises the estimated path time. It then consists in routing objects by applying this optimum configuration (E4c2 stage) Finally stage E4c3 consists in sending acknowledgements of receipt to the preceding routers to inform them that the objects have indeed been routed. In other words, if n objects Pi (Si, di) should be routed in a router x then the following is needed:
to select the best dynamic allocation configuration $\tilde{\psi}$:

$$\tilde{\psi} = arg\ min_\psi \Sigma_{i=1}{}^n(S_x(d_i,y_i(\psi))+2\cdot Q_x(d_i,y_i(\psi)))\_\_ \qquad \text{Eq. 1}$$

to route the objects following the optimum configuration $\tilde{\psi}$, i.e., allocate to each object $P_i$ the $y_i$ output $(\tilde{\psi})$
to send as acknowledgement of receipt to the router of origin $S_i$ the object $P_i$ $(S_i, d_i) \in$ Ptransit:

$$t_x(d_i) = Q_x(d_1,y_1(\tilde{\psi})) \qquad \text{Eq. 2}$$

where $y_i$ $(\tilde{\psi})$ designates the output actually by routing over the object $P_i$ $(S_i, d_i)$.

Indeed, the routing is done on the basis of the value $S_x$ $(d_i, y_i(\tilde{\psi})) + 2\cdot Q_x$ $(d_i, Y_i(\tilde{\psi}))$ in which $S_x$ $(d_i, Y_i(\tilde{\psi}))$ represents the distance of the shortest path for the object I to go from x to its destination di by routing over the path $y_i$ $(\tilde{\psi})$. As $Q_x$ $(d_i, Y_i(\tilde{\psi}))$ designates the number of deflections estimated on the most followed path to go from x to di via $y_i$ $(\tilde{\psi})$ during the last iterations the variable $S_x$ $(d_i, y_i(\tilde{\psi}))$ represents the estimation of the number of routers which the object I will cross on its path exiting by $y_i$ $(\tilde{\psi})$. Since all the links are, hypothetically, of the same length this value is directly proportional to the transit time. As a consequence the routing is done by optimising the transit time of the objects. This time is estimated dynamically with the help of an internal indicator (for example, the number of deflections undergone).

The invention process is carried out by the E4d stage, which consists of updating the routing value table. Updating the routing value table is done as follows:

A table Tx which is specific to it is linked to each router x:

$$T_x = \{Q_x(d,z)/z \in v(x), d: \text{network router}\}$$

With v (x): set of routers next to x

Qx (d, z): a value linked to the triplet (router x, destination d, output z).

More specifically the E4d stage includes a E4d1 intended to check if an acknowledgement of receipt has been received by the router x coming from a neighbouring router Yi for the destination di. If this is the case then for all the y routers neighbouring x (E4d2 stage) one checks in an E4d3 stage if y is the exit corresponding to the router from where the acknowledgement of receipt comes. If this is the case then the value table Q is updated according to the "training" mode (E4d4 stage). If it is not the case then the value table is updated according to the "detraining" mode (E4d5 stage). On the other hand, if no acknowledgement of receipt has been received by the router x to the E4d4 stage then we go straight to the end of the process for the iteration k.

This E4d stage can be written as follows:

For every y belonging to it in the neighbourhood of x:

if $y=y_i$, i.e., y is the exit corresponding to the router from where the acknowledgement of receipt comes then:

$$Q_x(d_1,y) := (1-\eta)\cdot Q_x(d_1,y) + \eta(q_x(d_1,y) + t_y(d_1)) \qquad \text{(Eq. 3)}$$

where $q_x$ $(d_i, y) = 1$ if y does not belong to one of the shortest topological paths between x and $d_i$ (deflection) and $q_x(d_i, y) = 0$ otherwise Otherwise:

$$Q_x(d_1,y) := \gamma \cdot Q_x(d_1,y) + (1-\gamma)\cdot Q_x{}^{t=0}(d_1,y) \qquad \text{Eq. 4}$$

This dynamic estimation is therefore produced taking into account whether during the updating of the routing table the routing has or has not deflected the object. Updating the routing table uses the information of the allocation chosen for the preceding objects already passed by the router x considered. We can thus obtain information on the congestion of the network.

The updating process of the values $Q_x$ according to the "training" mode is as follows:

$$Q_x(d_1,y):=(1-\eta).Q_x(d_1,y)+\eta.(q_x(d_1,y)+t_y(d_1))$$

In which:
- qx (di, Y)=1 if y does not belong to one of the shortest topological paths between x and di (ie if there is deflection) and qx (di, Y)=0 otherwise
- $t_x(d_i)=Q_x(d_i, y_i, (\tilde{\psi}))$ and $y_i(\tilde{\psi})$ designates the output allocated to the object of by the allocation $\tilde{\psi}$.

In the equation (Eq. 3) the immediate cost of the action decided by the routing procedure is equal to qx (di, y) which is worth 1 (penalisation) if the routing imposes a deflection to the object routed and which otherwise is worth 0 (non penalising).

Thanks to this expression in a stationary regime, the system will dynamically learn a value Qx (di, y) indicating the number of deflections which the object will be likely to undergo if it routes over exit y to go from x to di.

The use of exit $y_i(\tilde{\psi})$, an exit actually routed over by the object $P_i(S_i, d_i)$ is of the highest importance. Indeed, it is thanks to this that the knowledge of the paths actually navigated by the objects could be spread through the network.

The updating procedure according to the "detraining" mode consists, at each iteration, of systematically updating the Q table of values independently of the training due to the traffic by using the updating formula:

$$Q_x(d_1,y):=\gamma.Q_x(d_1,y)+(1-\gamma).Q_x^{t=0}(d,y)$$

with $\gamma \in [0, 1]$. In this formula detraining by the neglect factor is applied for each allocation of a Pi object in x going from di and being routed on the motor $y_i$ by the routing procedure on the three neighbouring routers for x different from y. The objective is to slowly come back to the initial values of the shortest path in the absence of traffic so as to improve the adaptation of the network during passage of a phase of heavy traffic to a phase of light traffic. The phenomenon of hysteresis is thus reduced and it is possible to carry out the routing of objects in non-stationary traffic.

The values Qx (di, Y) are thus modified to each iteration in two possible ways.

The first way corresponds to the training and is linked to a possible feedback from neighbours.

The second way is linked to detraining ie a partial neglect of old values; it concerns for the pair (x, di) the Y exits other than those from which comes the acknowledgement of receipt received. In the absence of a return message from neighbours. The values Q converge geometrically to their reference value. There is therefore competition between the training dynamic of value tables and the duplicated dynamic. The neglect speed is regulated by the parameter ☐. The choice of ☐ is important. Indeed if it is too weak the algorithm forgets quicker than it learns and thus damages the performances of the Q-routing: if it is too big the process can be badly adapted to the sporadicity of the traffic.

Thus the invention process allows the routing of objects in a network of routers in which priority is given to objects already present in the network. Also it allows an adaptation to non-stationary traffic conditions. The routing used in this process is automatically adapted to the network load. Each router estimates the network congestion that avoids sending the objects in the network zones that are congested.

What is claimed is:

1. An adaptive routing process of objects in a network containing a plurality of network routers linked by links, each network router including M incoming links, N outgoing links, internal and external queues, an M size routing buffer and a processing module, and the each network router being linked with a routing table including values relating to an estimation of a number of deflections undergone by each object at the start of the network router for a given destination, the process including a first initialization stage for value tables linked with the each network router and a recurrent processing stage of each network link, the recurrent processing stage comprising:
    a) detecting that at least one object has arrived on at least one network router
    b) considering each network link and determining if there is the at least one object on the considered links
       if there is the at least one object on the considered link, moving the at least one object along the link for a unit of time
       if there is not the at least one object on the considered link, waiting for a unit of time
    c) considering each network router and for each of the considered network routers detecting the state of incoming links
       if the presence of an object is detected on an incoming link and the destination thereof is the considered network router, then removing the detected object,
       if no object whose destination is the considered network router is detected on the incoming links, then checking the state of the internal queue of the considered network router,
       if the internal queue of the considered network router contains objects then transferring these contained objects in the routing buffer of the considered network router,
       if the routing buffer of the considered network router is not full then verifying if the objects are on standby in the external queue and filling the buffer with one or more of the objects on standby,
    d) allocating content of the routing buffer on the outgoing links of the considered network router according to the linked routing table and dynamically estimating the number of deflections which objects will undergo on forward points of the considered network router to reach their destination,
    e) updating the linked routing table values to estimate the number of deflections undergone on a whole path by the objects.

2. The process according to claim 1, wherein, upon arrival of the object at a destination router, said destination router sends to a preceding router an acknowledgement of receipt indicating an estimated number of deflections undergone by the object to reach the destination router.

3. The process according to claim 2 wherein step c) consists of updating network routing tables by taking into account information contained in the acknowledgment of receipt sent by neighboring network routing tables.

4. The process according to claim 2 wherein steps c) to e) are carried out successively for the each network router.

5. The process according to claim 2 wherein steps c) to e) are carried out simultaneously for the each network i-outer.

6. The process according to claim 1 wherein steps c) to e) are carried out successively for the each network router.

7. The process according to claim 1 wherein steps c) to e) are carried out simultaneously for the each network router.

8. The process according to claim 7 wherein step c) consists of updating network routing tables by taking into account information contained in the acknowledgment of receipt sent by neighboring network routing tables.

* * * * *